United States Patent
Mohandas

(10) Patent No.: US 8,107,540 B2
(45) Date of Patent: Jan. 31, 2012

(54) IMAGE COMPLEXITY COMPUTATION IN PACKET BASED VIDEO BROADCAST SYSTEMS

(75) Inventor: Praveen A. Mohandas, Thousand Oaks, CA (US)

(73) Assignee: Cheetah Technologies, L.P., Pittsburgh, PA (US)

( * ) Notice: Subject to any disclaimer, the term of this patent is extended or adjusted under 35 U.S.C. 154(b) by 1479 days.

(21) Appl. No.: 11/456,505

(22) Filed: Jul. 10, 2006

(65) Prior Publication Data

US 2007/0009045 A1     Jan. 11, 2007

Related U.S. Application Data

(60) Provisional application No. 60/595,503, filed on Jul. 11, 2005.

(51) Int. Cl.
     *H04B 1/66* (2006.01)
(52) U.S. Cl. ......... 375/240.26; 375/240.03; 375/240.05; 375/240.13; 375/240.12; 375/240.01; 382/235; 382/251; 382/238; 382/234
(58) Field of Classification Search ............. 375/240.26, 375/240.03, 240.05, 240.13, 240.12, 240.01; 382/235, 251, 238, 234
See application file for complete search history.

(56) References Cited

U.S. PATENT DOCUMENTS

| | | | |
|---|---|---|---|
| 5,115,309 A | 5/1992 | Hang | |
| 5,686,964 A | 11/1997 | Tabatabai et al. | |
| 6,654,416 B1 | 11/2003 | Alexandre et al. | |
| 6,741,569 B1 | 5/2004 | Clark | |
| 7,058,048 B2 | 6/2006 | Clark | |
| 7,075,981 B1 | 7/2006 | Clark | |
| 7,085,322 B2 | 8/2006 | Ngai et al. | |
| 7,116,717 B1 | 10/2006 | Eshet et al. | |
| 7,142,599 B2 | 11/2006 | Henocq | |
| 7,355,530 B2 | 4/2008 | Labelle | |
| 2002/0094031 A1 * | 7/2002 | Ngai et al. | 375/240.27 |
| 2002/0154227 A1 * | 10/2002 | Lan et al. | 348/240.2 |
| 2003/0121053 A1 | 6/2003 | Honda | |
| 2003/0149930 A1 | 8/2003 | Rey et al. | |
| 2004/0062313 A1 | 4/2004 | Schoenblum | |
| 2004/0156438 A1 | 8/2004 | Choi | |
| 2004/0184529 A1 | 9/2004 | Henocq et al. | |
| 2005/0084007 A1 * | 4/2005 | Lightstone et al. | 375/240.03 |
| 2005/0175091 A1 | 8/2005 | Puri et al. | |
| 2005/0276284 A1 | 12/2005 | Krause et al. | |
| 2006/0268701 A1 | 11/2006 | Clark | |
| 2006/0276983 A1 | 12/2006 | Okamoto et al. | |

(Continued)

FOREIGN PATENT DOCUMENTS

WO     0180492 A2     10/2001

(Continued)

OTHER PUBLICATIONS

N. Mohsenian, R. Rajagopalan, and C.A. Gonzales: Single-pass constant-and variable-bit-rate MPEG-2 video compression; IBM Journal of Research and Development, vol. 43, No. 4, 1999.

(Continued)

*Primary Examiner* — Shawn An

(74) *Attorney, Agent, or Firm* — Kelly Lowry & Kelley, LLP

(57) ABSTRACT

A method to determine real time image complexity in video streaming, IPTV and broadcast applications using a statistical model representing channel bandwidth variation and image complexity that considers scene content changes. Available channel bandwidth is distributed unevenly among multiple video streams in proportion to bandwidth variation and image complexity of the broadcast video stream. The distribution of available channel bandwidth is determined based upon an image complexity factor of each video stream as determined from probability matrices considering bandwidth variations and image complexity.

21 Claims, 7 Drawing Sheets

U.S. PATENT DOCUMENTS

| | | |
|---|---|---|
| 2007/0009045 A1 | 1/2007 | Mohandas |
| 2007/0140134 A1 | 6/2007 | Clark |
| 2008/0129560 A1 | 6/2008 | Baraniuk et al. |
| 2008/0137667 A1 | 6/2008 | Mohandas |
| 2008/0216116 A1 | 9/2008 | Pekonen et al. |

FOREIGN PATENT DOCUMENTS

| | | |
|---|---|---|
| WO | 0191343 A2 | 11/2001 |
| WO | 2006069219 A2 | 6/2006 |
| WO | 2007075918 A2 | 7/2007 |

OTHER PUBLICATIONS

Hongtao Yu, Zmiping In, Senior Member, IEEE and FENG PAN, Senior Member, IEEE: Applications and Improvement of H.264 in Medical Video Compression; IEEE Transactions on Circuits and Systems-k Regular Papers, vol. 52, No. 12, Dec. 2005, pp. 2707-2716.

* cited by examiner

IMAGE COMPLEXITY COMPUTATION IN PACKET BASED VIDEO BROADCAST SYSTEMS

BACKGROUND OF THE INVENTION

The present invention relates generally to broadcast systems. More particularly, the present invention pertains to methods of estimating the complexity of a series of images in compressed video programs that use MPEG compatible encoding.

In typical broadcast systems, such as in IPTV (Internet Protocol Television) and direct broadcast satellite (DBS) applications, multiple video programs are encoded in parallel, and the digitally compressed bitstreams are multiplexed onto a single, constant or variable bit rate channel. The available channel bandwidth could be distributed unevenly among programs, in proportion to the information content/complexity of each of the video sources. The monitoring system that computes video quality by measuring impairments could take into account the image complexity factor of the video stream to calculate the different effects of impairments on lesser or more complex images.

MPEG encoded variable bit rate (VBR) video traffic is expected to dominate the bandwidth of broadband networks. This could be delivered in streaming, on demand, IPTV or DBS types of environments. Accurate models of VBR or CBR video complexity is necessary to enable monitoring systems for prediction of performance of any proposed network during its operation. FIG. 1 shows components that are involved in delivering video content in a typical IPTV environment. Video source that originates as analog signal is encoded using an encoder and packetized and sent using an IP network. It could be sent as multicast or unicast to the network. The core contains various elements to provision and manage subscribers and traffic flows. The content is stored in content servers and delivered on demand upon user request. At various points in the network, measurements can be performed for impairments by service assurance managements systems.

MPEG coding standards define three picture types (I, B and P) and encodes pictures with a fixed arrangement. Picture type changes could occur due to scene transitions. In the event of an abrupt transition, the first frame of the new scene is intra-coded (I-frame) in order to avoid severe coding errors. During a gradual scene transition, the distance between two reference frames (I or P) can be changed to improve the picture quality. During most of these gradual transitions, temporal correlation tends to be reduced. This situation demands more frequent placement of predicted reference frames (P-frames) to uphold the required picture quality. When the video sequence contains rapid motions, this may also require frequent P-frames in order to improve picture quality. This increases the bit rate. On the other hand, if the scene does not contain any rapid motions or gradual scene transitions, the inter-frame (I-frame) reference distance can be increased without affecting the picture quality. This is due to the strong correlation between frames.

Accordingly, what is needed is a process to analyze the Video Coding Layer (VCL) complexity indication changes and bit rate changes in the video stream by analyzing VCL parameters including, but not limited to slice, macroblocks, quantization, INTER/INTRA coded reference and non-reference macroblock/slice/picture types and arrive at a statistical model to compute image complexity dynamically, so that impairment monitors could use this value to determine their effect on a sequence of complex images.

SUMMARY OF THE INVENTION

The present invention provides a way to estimate image complexity in real time by statistical analysis of VCL parameters and bandwidth variation in video program stream. This value could be used by monitoring and other applications to estimate video quality in loss states, and make a better estimate on perceived quality by the human visual system.

The process for broadcasting multiple video streams on a single channel begins with analyzing complexity indication changes and bit rate changes in a video coding layer of each of the multiple video streams. Next, a statistical model is created to dynamically compute the image complexity of each of the multiple video streams. The effect of the image complexity of each of the multiple video streams on the broadcast is then determined. Available channel bandwidth is distributed among the multiple video streams based upon the determined effect of the image complexity of each of the multiple video streams.

The process further involves estimating video quality in certain loss states.

Analyzing the complexity indication changes involves analyzing changes in parameters of discrete sections of the video streams. The discrete sections of the video streams include slice, macroblocks, quantization, inter-coded reference blocks, intra-coded reference blocks, and non-reference macroblock/slice/picture types.

Creating the statistical model involves creating a first statistical model of video coding layer complexity indication changes for discrete sections of each video stream. Further, a second statistical model of video coding layer bit rate changes or bandwidth variation is created for the same discrete sections of each video stream. The first and second statistical models from the discrete sections of each video stream are then combined. Image complexity of the discrete sections of each video stream is calculated based upon the combined first and second statistical models.

High quantization transitions, slice/macroblocks and inter/intra prediction types for picture/slice/macroblock types are counted by determining quantization changes in each video stream. Bandwidth variation is counted by determining the bandwidth of the video coding layer data in each video stream. The counting is accomplished by incrementing a first counter for each quantization change, a second counter for each macroblock, a third counter for each slice, and a fourth counter for each low, average and high bandwidth state transition.

A probability for complexity of the video coding layer complexity for discrete sections of each video stream is computed using the first, second, third and fourth counters. Further, a probability for low, average and high bandwidth states for the discrete sections for each video stream is computed using the first, second, third and fourth counters. A first transition probability matrix is constructed for video coding layer complexity transition of the discrete sections of each video stream and a second transition probability matrix is constructed for bandwidth state transition of the discrete sections of each video stream. An image complexity value of the discrete sections of each video stream is computed using limiting state probabilities obtained from each transition probability matrix.

The method can be used by collectors to get image complexity value from distributed remote probes; to facilitate computation of impairments in packetized video stream using image complexity as a variable to get more accuracy towards perceived video quality; to provide image complexity at regular intervals for packetized video applications; to provide an estimation on video complexity as perceived by human visual system; to provide Image complexity measurements for typical industry wide video quality assessment models, including and not limited to Peak Signal to Noise Ratio (PSNR), MPQM, MQUANT and Root Mean Square Error (RMSE); to provide offline and real time image complexity measurements that could be used or incorporated by video encoders, multiplexers, routers, VOD servers (video on demand), broadcast servers and video quality measurement equipments; to provide a statistical model for bandwidth variation that contributes to image complexity; to provide a statistical model for video coding layer complexity that contributes to scene transitions; and to determine the statistical distribution of series of images in a low complexity state and a high complexity state.

Other features and advantages of the present invention will become apparent from the following more detailed description, taken in connection with the accompanying drawings which illustrate, by way of example, the principals of the present invention.

BRIEF DESCRIPTION OF THE DRAWINGS

The accompanying drawings illustrate the invention. In such drawings.

DETAILED DESCRIPTION OF THE PREFERRED EMBODIMENTS

A preferred embodiment of the present invention is illustrated in FIGS. 2-10. An embodiment of the present invention can be utilized in an IPTV delivery system such as that illustrated in FIG. 1.

The present invention relates to a method of estimating image complexity in a series of images in a video stream supporting MPEG type picture encoding. The method includes creating, during a flow of encoded video stream, a statistical model representing the VCL parameters as quantization, macroblock/slice counts, macroblock sizes 16×16, 16×8, 8×8, 4×4, 8×16, picture type variation as inter, intra, I/B/P frame/macroblock types variation that determines the probability of causing scene transitions. During the same flow of encoded video stream, a statistical model representing bandwidth variation that determines the probability of high and low bandwidth states is also created. Image complexity is then determined from the two statistical models created from the same flow of encoded video stream. The method can be used to provide a distributed system to estimate perceived video complexity.

The method also includes: determining the quantization changes to count the high quantization transitions, slice/macroblock counts for the monitoring interval, Inter/Intra prediction types for picture/slice/macroblock types (I,B,P) and determining the bandwidth of VCL data to count the bandwidth variation; incrementing a counter for quantization changes, incrementing counters for macroblock and slice types and sizes, and incrementing a counter for bandwidth low, average and high state transitions; computing probability from the counters for state transitions for video coding layer complexity, and computing probability from the counters for state transitions for low, average and high bandwidth states; and computing a transition probability matrix for video coding layer complexity transition and computing a transition probability matrix for bandwidth state transition.

Figure 1:
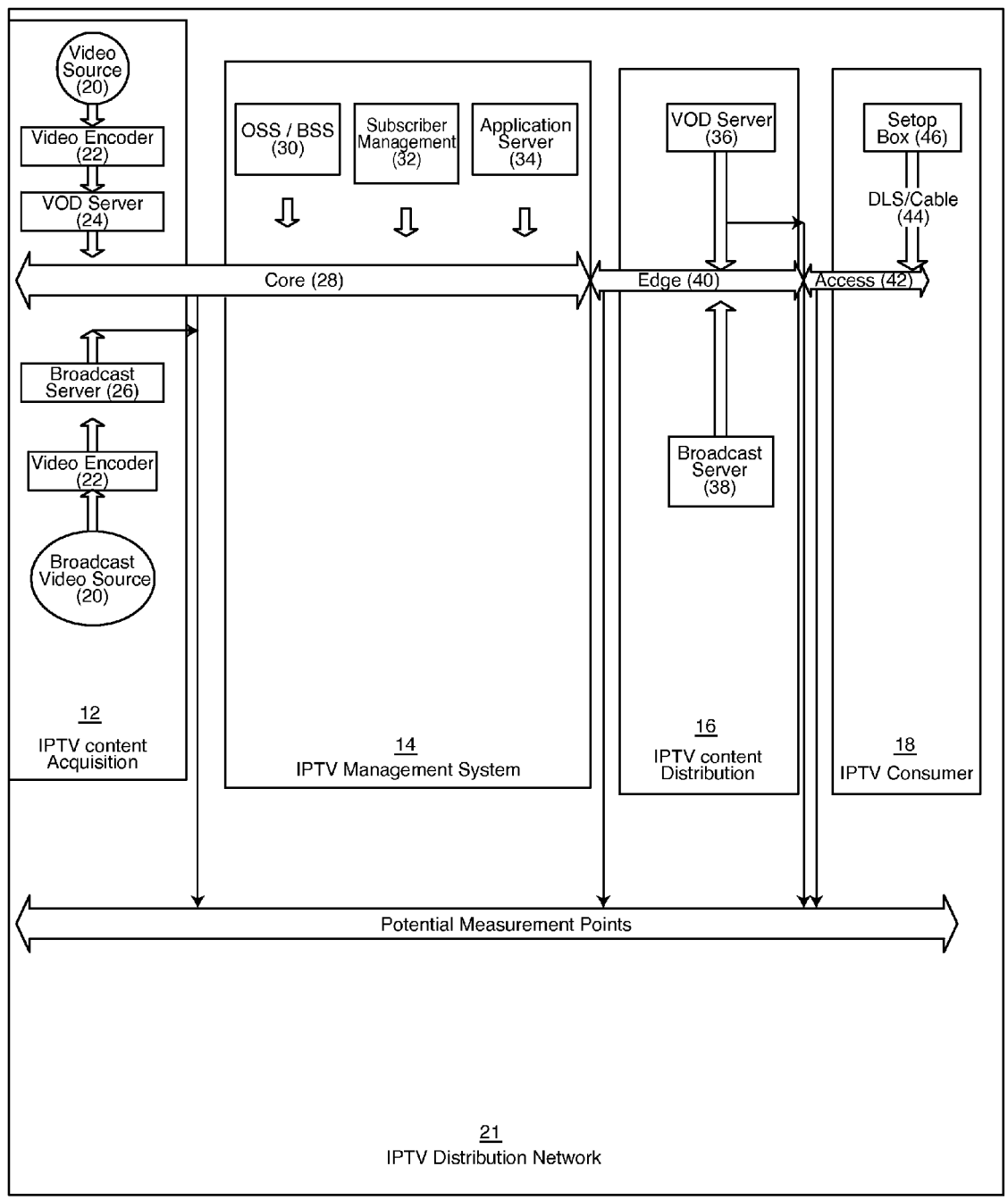
FIG. 1 shows an example of an IPTV (IP television) distribution network with potential points where measurements for image complexity could be done.

As outlined above, FIG. 1 shows a typical IPTV distribution network 21 that includes Video content acquisition 12, IPTV management system 14, IPTV content distribution 16 and IPTV consumer 18. Video Source 20 is usually acquired in analog form and encoded in MPEG 1/2/4 format by a video encoder 22 and sent to a Video on Demand (VOD) server 24 or a Broadcast server 26. The VOD server 24 encapsulates the content into a program stream for transport to a network core 28. The network core 28 is a relatively higher bandwidth pipe. An IPTV network 21 also consists of a variety of management, provisioning and service assurance elements. Typically it includes the Operation Support System (OSS) 30, Subscriber management system 32 and application servers 34 to create new value added services. Following the management, provisioning and service assurance, the content could be stored in a VOD server 36 or a broadcast server 38 that is accessible by the consumer. It is typically located at an edge 40 of the network 21. A consumer has access to their broadband access line 42, which could be a Cable/DSL line 44. A television is typically connected to a setop box 46 that decodes the video stream to component output.

Figure 2:
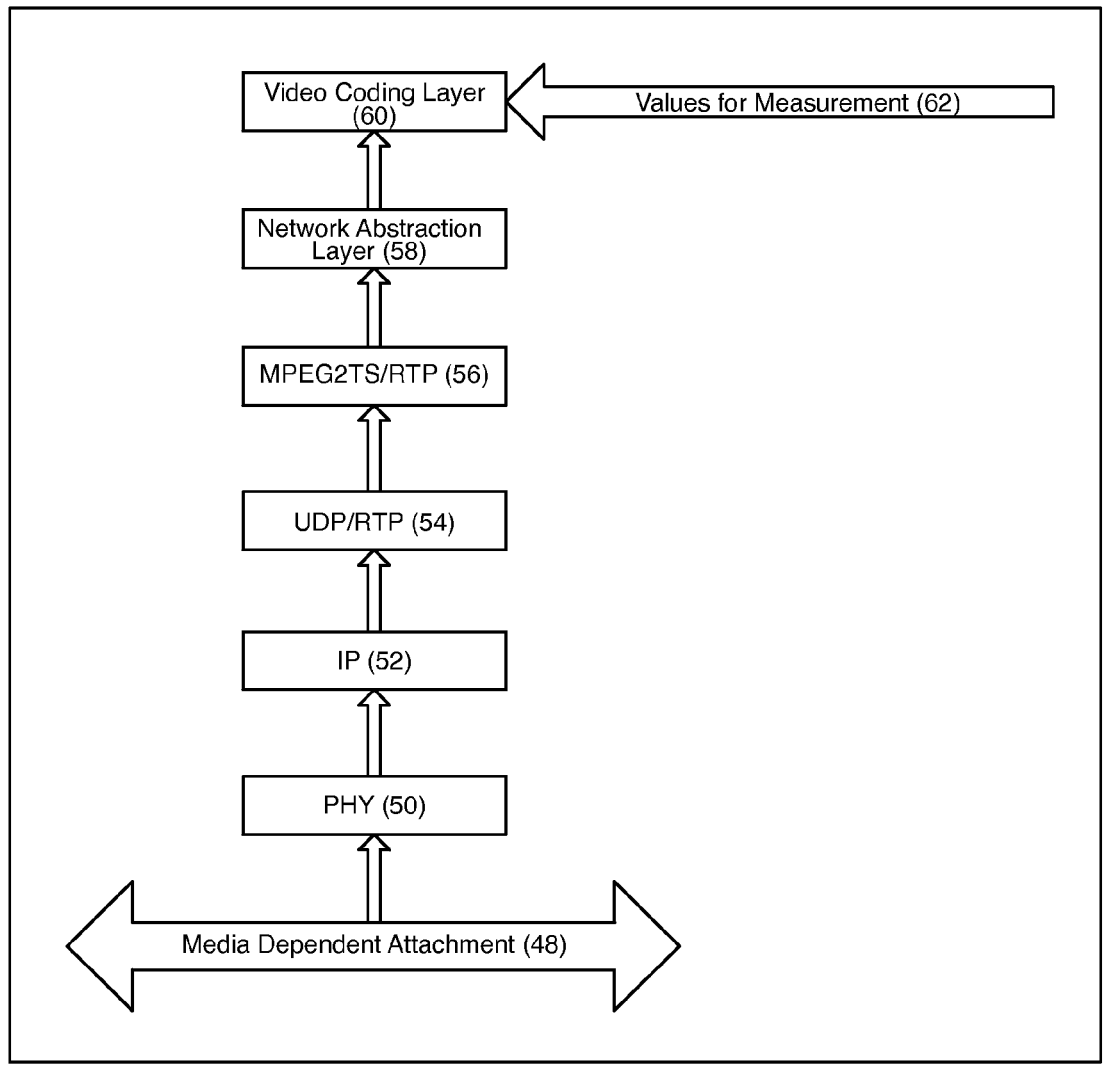
FIG. 2 shows a typical protocol stack where MPEG frames are encapsulated in IP (Internet Protocol) and where the values for measurement are extracted at the VCL level.

A protocol stack for a packetized video stream is illustrated in FIG. 2. Media dependent attachment 48 could be Ethernet, Sonet, DS3, cable, or DSL interface. A PHY 50 does the media dependent packet processing. An IP (Internet Protocol) 52 is the network layer part that provides mainly addressing for packet routing in the IPTV network 21. A UDP/RTP 54 is the transport layer that provides application level addressing for ports. The video stream can be encapsulated in the UDP/RTP or just UDP layer 54. The encoded video can be compressed in MPEG 1/2/4 and sent as a transport stream or in RTP encapsulation for video 56. There can be an optional Network Abstraction Layer 58 as is the case for H.264/AVC. A video coding layer packet input 60 is decoded and necessary parameters are extracted to get the values for measurement 62 for the image complexity model, as described below.

Figure 3:
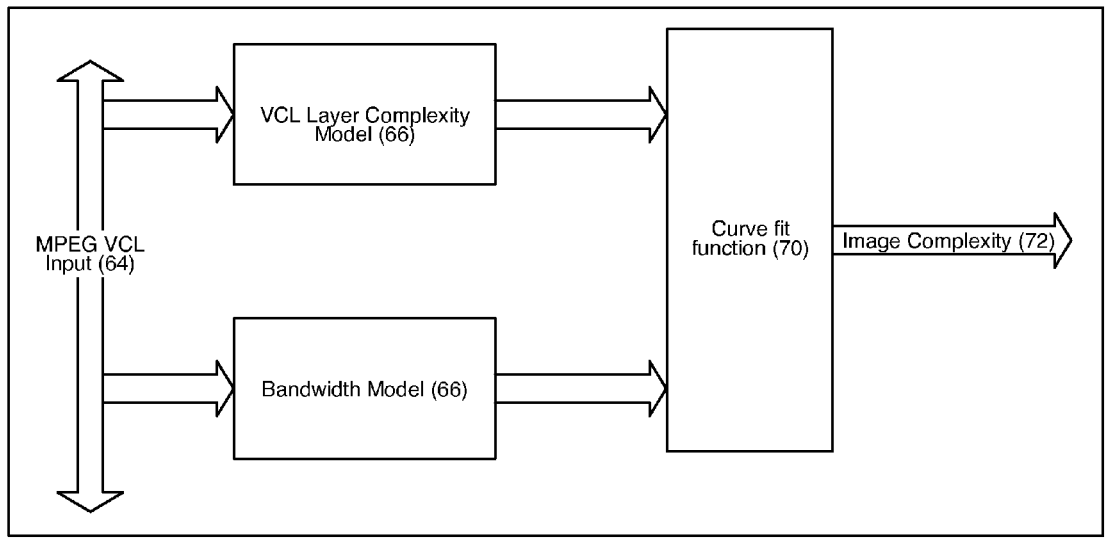
FIG. 3 shows a statistical model for computing Image Complexity with the final curve fit equation.

FIG. 3 provides the high level logic for the statistical models in an embodiment of the present invention. MPEG VCL input 64 is provided to both a VCL complexity (I-frame) model 66 and a bandwidth model 68 to compute the counters needed for the statistical models. A curve fit equation 70 takes the model output parameters and computes image complexity 72.

Figure 4:
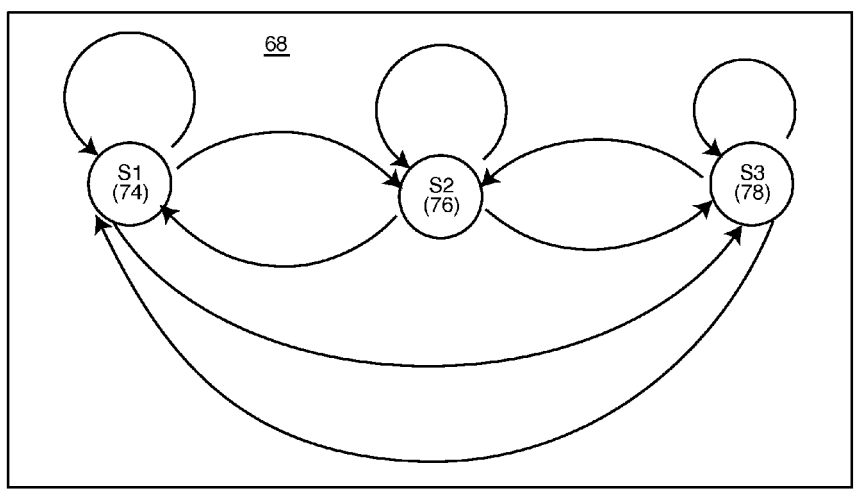
FIG. 4 shows a Markov transition process for a Bandwidth model.

FIG. 4 illustrates discrete Markov process state transitions for the bandwidth model 68. The bandwidth variations in video sequence are modeled into a three state Markov process to determine the probability of low and high bandwidth state transitions. State one (S1) 74, State two (S2) 76 and State three (S3) 78 respectively represent states of the model 68 in low, constant and high bandwidth states.

Figure 5:
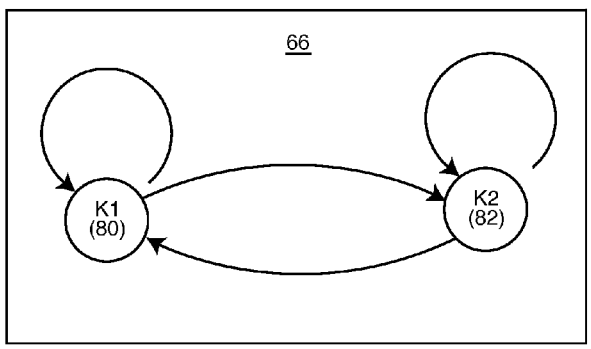
FIG. 5 shows a Markov transition process for a Video Coding Layer Complexity model.

FIG. 5 illustrates discrete Markov process state transitions for the VCL layer complexity quantization model 66. The quantization transitions retrieved from the macroblock layer is modeled into a two state Markov process. K1 80 and K2 82 show states of the VCL layer complexity model 66—quantization high and quantization low states.

Figure 6:
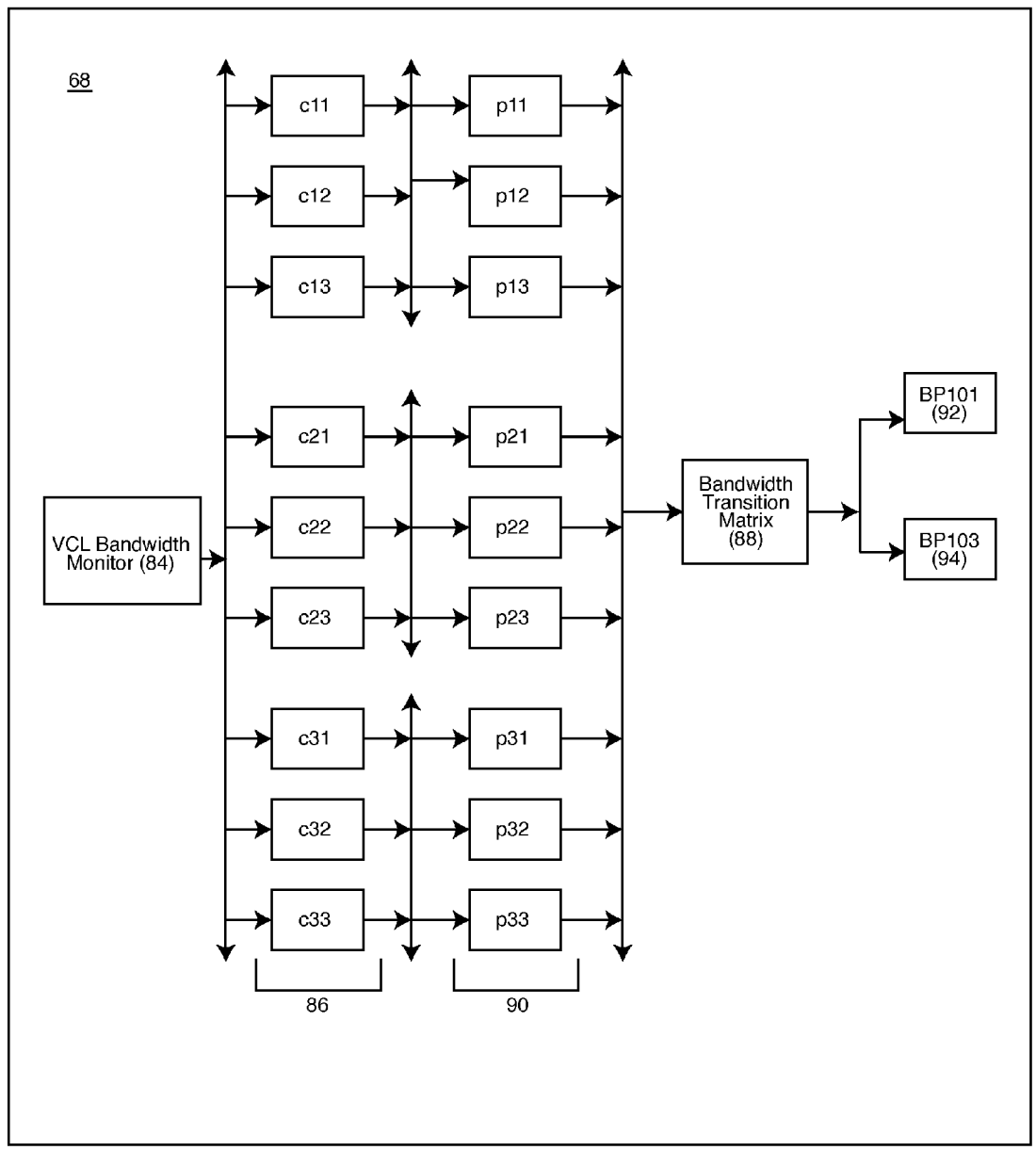
FIG. 6 shows the counters and transition matrix relationship for the Bandwidth model.

FIG. 6 illustrates the counters 86 used to compute the transition probabilities 90 of the bandwidth model 68. A VCL bandwidth monitor 84 monitors the bandwidth variations in the VCL stream and updates counters cXY 86, where X represents the initial state and Y represents the resulting state. The initial and resulting states may be low, constant or high bandwidth states designated as 1, 2 or 3, respectively. For instance, C11 represents the state transition event from a low bandwidth state 74 to a low bandwidth state 74, and C23 represents the state transition event from a constant bandwidth state 76 to a high bandwidth state 78.

State transition probabilities 90 are computed to get a transition matrix 88. The State transition probabilities 90 are represented by pXY where X represents the initial state and Y represents the resulting state. The initial and resulting states may be low, constant or high bandwidth states designated as 1, 2 or 3, respectively. For instance, p12 is the transition probability to go from the low bandwidth state (S1) 74 to the constant bandwidth state (S2) 76. From the transition probabilities 90, the transition matrix 88 is formed. From the transition matrix 88, limiting state probabilities are computed without the initial conditions to get BP101 92 and BP103 94. These values represent the probability to stay in the low bandwidth state and the high bandwidth state, respectively.

Figure 7:
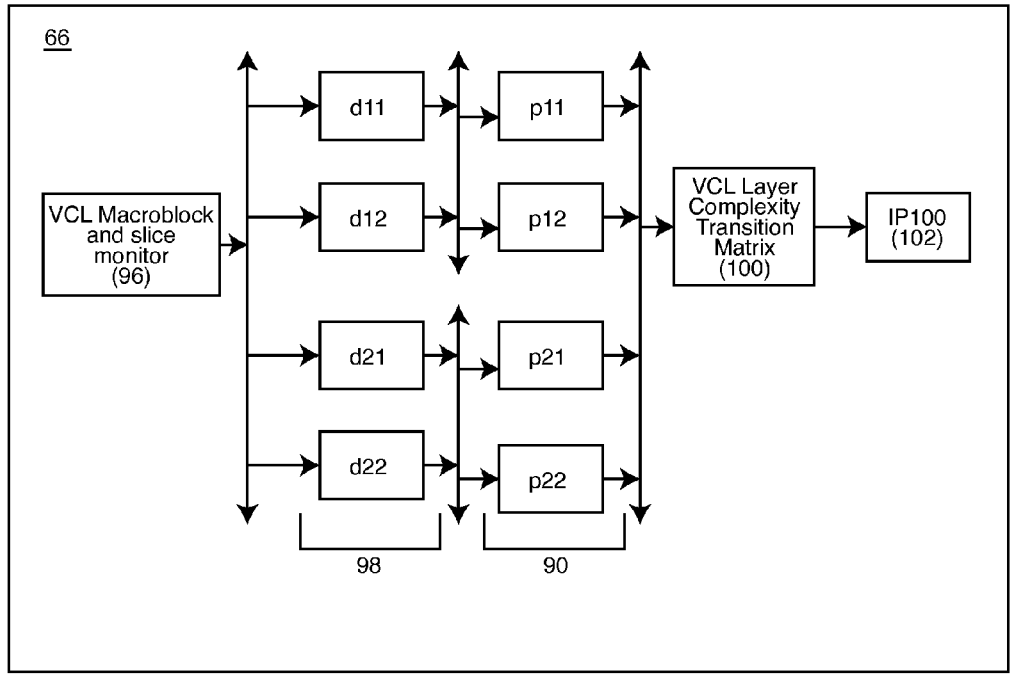
FIG. 7 shows the counters and transition matrix relationship for the Video Coding Layer Complexity model.

Counters 98 used to compute the transition probabilities for the VCL layer complexity quantization model are seen in FIG. 7. A VCL slice and macroblock monitor 96 monitors the quantization parameter in the macroblock and updates counters dXY where X represents the initial state and Y represents the resulting state. The initial and resulting states may be quantization high or quantization low received states designated as 1 or 2, respectively. For instance, d12 represents the state transition event counts from a quantization high received state to a quantization low received state. State transition probabilities are computed to get a transition matrix 100 for the VCL layer quantization model 66. From the transition matrix 100, the probability of a high quantization occurrence in a picture sequence is computed and set in variable IP100 102.

Figure 8:
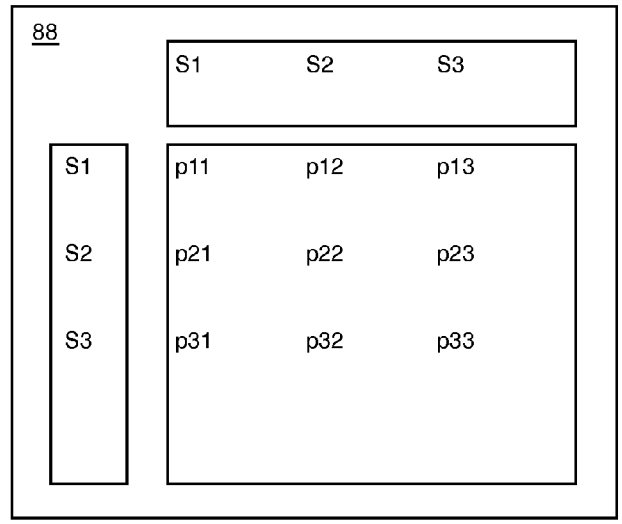
FIG. 8 shows the transition probability matrix for a Bandwidth variation model.

The transition probability matrix 88 for the bandwidth model 68 is illustrated in FIG. 8. States S1 74, S2 76 and S3 78 represent low, average and high bandwidth states, as outlined above, and each cell in the matrix 88 represents the probability of state transition from one state to another.

Figure 9:
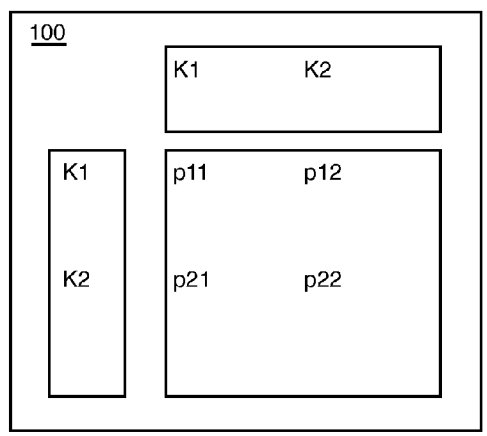
FIG. 9 shows the transition probability matrix for Video Coding Layer complexity model.

FIG. 9 shows a transition probability matrix 100 for the VCL layer quantization model 66. States K1 104 and K2 106 represent high quantization and low quantization occurrence states, and each cell in the matrix 100 represents the probability of state transition from one state to another.

Figure 10:
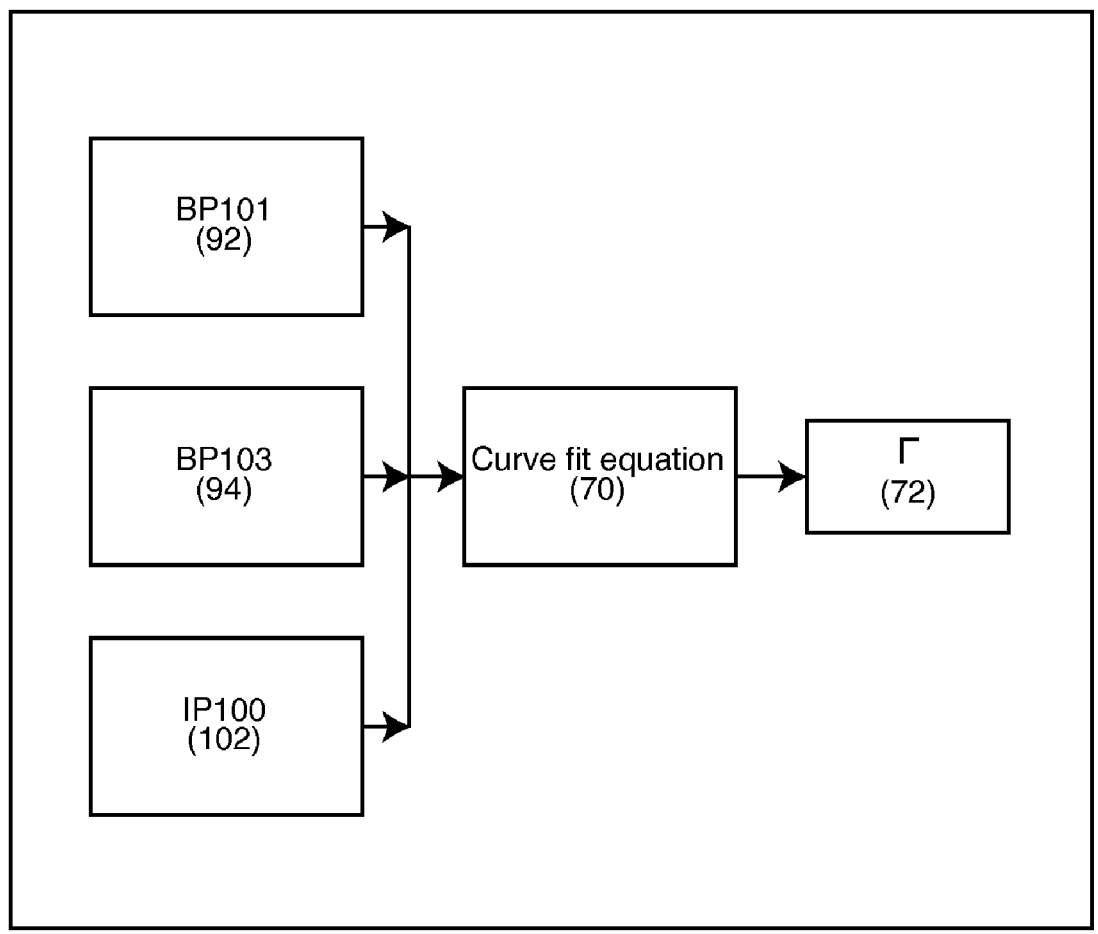
FIG. 10 shows the probability values and curve fit equation relationship that computes image complexity.

FIG. 10 illustrates the VCL layer complexity model 66 and bandwidth model 68 out parameters BP101 92, BP103 94 and IP100 102 used in the curve fit equation 73 of FIG. 3 to get image complexity ($\lceil$) 72 which ranges in value from 2 to 3.

Figure 11:
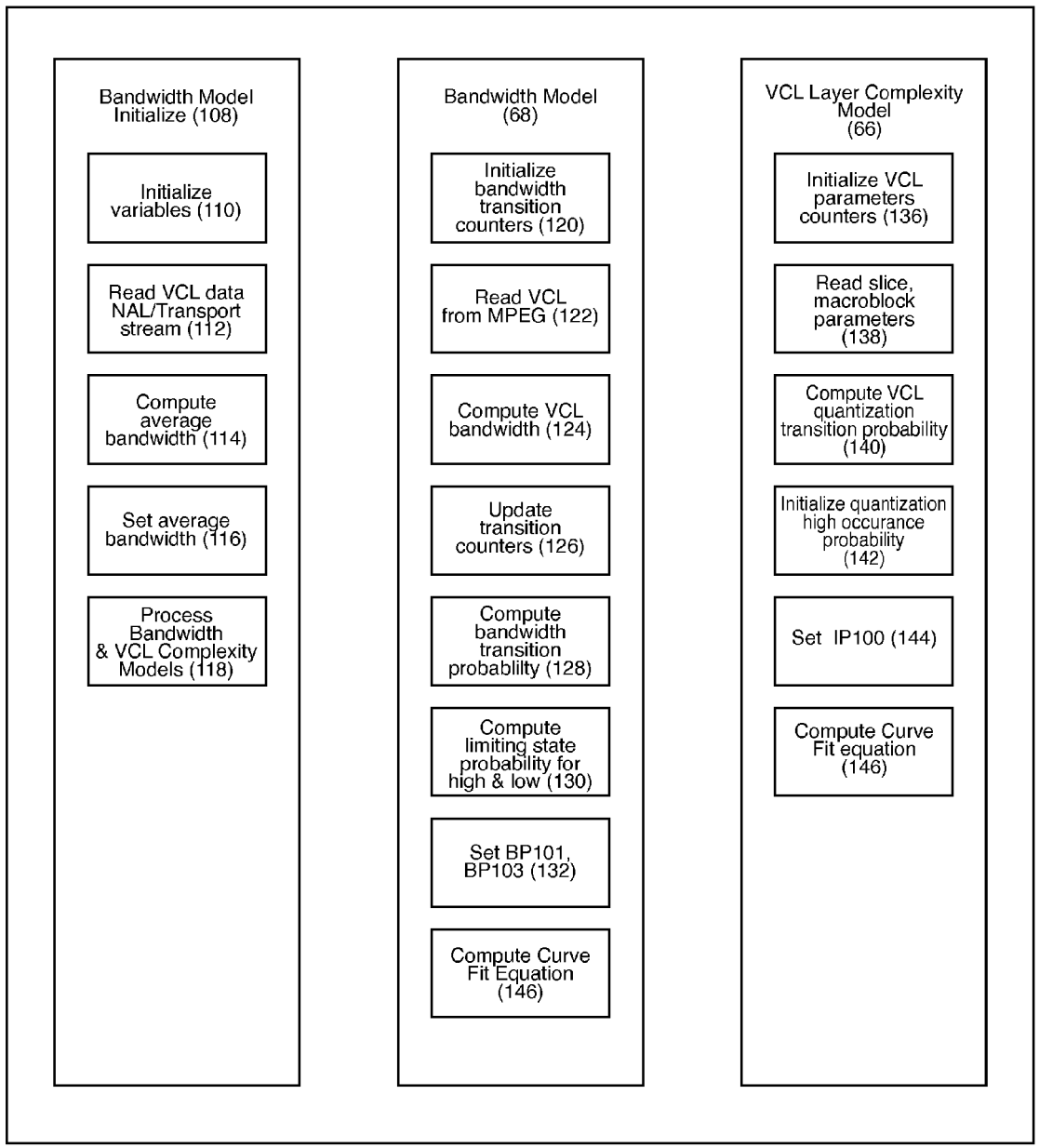
FIG. 11 shows the flowchart for the bandwidth and Video Coding Layer model computation

FIG. 11 illustrates a flow chart for the main functional blocks of the inventive process. A bandwidth model initialization 108 is the first step that needs to be performed to run the bandwidth 68 and VCL layer complexity 66 models. Variables to compute an average bandwidth are initialized 110. A VCL input is read from the NAL (Network Abstraction Layer)/transport stream 112. Average bandwidth for the VCL packets is computed 114 and set 116. During this operation, a bandwidth model 68 and a VCL layer complexity model 66 are run in parallel 118. The bandwidth model 68 is initialized for transition counters 120. The VCL packet size is read from the NAL/transport layer stream 122. Bandwidth for the VCL is computed 124. The transition counters are updated 126 and transition probability matrix is updated 128. The next step is to compute the high and state limiting state probabilities 130 using equations (1) and (2), as detailed below. The variables BP101 and BP103 are set 132. For every macroblock, the VCL complexity model 66 is run at the same time 118. The counters are initialized 136 and macroblock and slice quantization parameters are read from the NAL/transport stream 138 by decoding slice data from the VCL. The VCL complexity quantization transition probability matrix is computed 140 and limiting state probabilities are computed 142. The IP100 variable is then set 144. The final curve fit equation is computed 146 using variables BP101, BP103 and IP100.

The operation of an embodiment will now be explained in greater detail. A bandwidth model 68 is constructed using the Markov model in FIG. 4. The states S1 74, S2 76, and S3 78 pertain to the state of a VCL packet rate at any instance in time after processing a certain number of VCL packets or discrete sections. The bandwidth model 68 is initialized after the MPEG video stream creation. At this stage, the bandwidth model 68 determines average bandwidth of the video stream for each discrete section, i.e., at every sampling instance. The procedure to determine average bandwidth is as follows:

Initialize counters A100, A101, A102, A103, A104 to zero;
From the MPEG layer read VCL packet size for every NAL/transport layer packet received and set A100 for cumulative size received;
Increment A103 for every INTRA macroblock/picture type;
Increment A104 for every slice type;
Set A101 to first VCL received time in milliseconds;
Set A102 for every VCL received time in milliseconds; and
At each sampling instance, compute average bandwidth.

The calculation follows this procedure:

$$A100 = A100 + VCL\_size\_rcvd \text{ from MPEG layer}$$

If (A101=0) then A101=current time
A102=current time $$C100 = A100 * 8 / (A102 - A101) / 1000 \text{ (in kbps)}$$

Average Bandwidth (C100) range will be C100±10 kbps.

The model is run only when a minimum pre-defined count of A103 is received. This counter indicates scene transitions and multiple scene transitions are needed to compute the model effectively. The model will be in the bandwidth low state (S1) if the current video stream bandwidth is lower than C100−10 kbps; for bandwidths higher than C+10 kbps the model will be in the bandwidth high state (S3). If the bandwidth is within the average bandwidth value, the model is in the bandwidth constant state (S2).

Average bandwidth (C100) is determined continuously for the VCL packets, the bandwidth variation can be modeled using the Discrete transition Markov Process illustrated in FIG. 4. The three states' (S1, S2 and S3) transitions are calculated by monitoring the video stream bandwidth variation. The transition matrix 88 (FIG. 8) is obtained, where each cell represents the probability of a state transition from a particular state to the next state. Since the Markov model for this process has no periodic states and its recurrent states form a single chain, the limiting-state probabilities are independent of the initial conditions. This condition could be applied to obtain P1 (probability to be in S1 state), P2 (probability to be in S2 state) and P3 (probability to be in S3 state). For limiting-state probabilities the following equations hold well:

$$0 = \sum_i P_i p_{ij} - P_j \qquad \text{Equation (1)}$$
$$j = 1, 2, 3$$

$$1 = \sum_j P_j \qquad \text{Equation (2)}$$

Since there are three variables (P1, P2, P3) to solve, three simultaneous equations are needed, each of which can be created from the transition matrix 88 (FIG. 8). The transition matrix 88 is constructed from the MPEG video stream bandwidth variation statistics. The transition matrix 88 is obtained by computing the probability to transition from a particular state to any other possible state, as illustrated in FIG. 8. For instance, the probability of staying in state S1 is represented by p11.

These transition probabilities are entered into equations (1) and (2) to obtain three simultaneous equations that can be solved to obtain P1, P2 and P3, where they represent the following: P1 (probability of the model to stay in low bandwidth state); P2 (probability of the model to stay in average/constant bandwidth state); and P3 (probability of the model to stay in high bandwidth state).

The probability of low and high transitions goes in to the final curve fit equation 70 to obtain an image complexity value 72. The algorithm to obtain P1, P2 and P3 is described as follows:

Initialize counters c11, c12, c13, c21, c22, c23, c31, c32, and c33 to 0;
state=S2 ; and
For several VCL packets in MPEG video elementary stream (configurable count)

If ($A103>5000$ (configurable count)||$A104>100$ (configurable count)) current_bandwidth= (vcl_size*8)/(current_time−previous_time)/1000

If (current_bandwidth>($C100+10$))

If (state=S1)
  ++c13.
else if ( state=S2)
  ++c23.
else
  ++c33 else if (current_bandwidth<($c100-10$))

if (state=S1)
  ++c11
else if (state=S2)
  ++c21
else
  ++c31
else
  if (state=S1)
    ++c12
  else if (state=S2)
    ++c22
  else
    ++c32
update state to current state At every sampling instance (e.g., 10 seconds), a transition matrix 88 is computed from the above. The transition probabilities are calculated from the relative frequencies of state transition.

$$p11=c11/(c11+c12+c13)$$
$$p12=c12/(c11+c12+c13)$$
$$p13=c13/(c11+c12+c13)$$
$$p21=c21/(c21+c22+c23)$$
$$p22=c22/(c21+c22+c23)$$
$$p23=c23/(c21+c22+c23)$$
$$p31=c31/(c31+c32+c33)$$
$$p32=c32/(c31+c32+c33)$$
$$p33=c33/(c31+c32+c33)$$

From the transition matrix, the probabilities P1 (low rate probability), P2 (constant/average rate probability) and P3 (high rate probability) are computed using three simultaneous equations formed utilizing equations (1) and (2).

Putting the transition probabilities into equation (1), the following is obtained:

$$0=P1*(p11-1)+P2*p21+P3*p31 \qquad \text{Equation (3)}$$
$$0=P1*p12+P2*(p22-1)+P3*p32 \qquad \text{Equation (4)}$$

From equation (2), the following is obtained:

$$1=P1+P2+P3 \qquad \text{Equation (5)}$$

After the equations are solved, the probabilities are assigned into these variables:
BP101=P1
BP103=P3

After the above three equations are solved, P1 and P3 are computed to use in the curve fit equation 70 to get the final image complexity 72.

For every VCL input, a VCL layer complexity model 66 needs to be run in parallel. VCL parameters are monitored for scene transitions and picture quality. The INTER/INTRA macroblock types are analyzed to determine scene transitions and quantization parameters inside the macroblock are read to determine picture quality as contributing to image complexity. After the VCL complexity model 66 is run, the curve fit equation 70 for image complexity can be solved to get the final image complexity value 72.

Computing VCL complexity probability follows a process similar to the one described above, but the Markov states are limited to two states. FIG. 10 shows the state transition process of the VCL complexity model. The states represent:

K1 (state where quantization high macroblock is received); and

K2 (state where a quantization low macroblock is received).

A transition matrix 100 (FIG. 9) that contains transition probabilities is computed. Each cell represents the state transition, e.g., p12 represents the probability of having a quantization low (K2) in quantization high received state (K1).

The procedure to compute transition probabilities is as follows:

For every VCL input, in an MPEG video elementary stream,

Initialize all counters d11, d12, d21, d22 to zero. Set state=K1.

To determine the quantization threshold to set high/low quantization states, read the initial quantization value from either picture parameter set (as in MPEG4) or from a pre-configured value if it is not available. Set C101 to this value.
Set C102 to zero for macroblock counts
Set C103 to zero for INTRA macroblock types
Set C105 to zero for Slice types
For every macroblock that is processed increment C102
For every INTRA macroblock type increment C103
For every Slice type increment C105
For every macroblock where quantization is available, read the quantization value in C104

```
If (state = K1)
If (C104 > C101 && C105 > 100 (configurable) && C103 > 3000
(configurable))
        ++d11;
else
        ++d12;
     else if (state = K2)
    If (C104 > C101 && C105 > 100 (configurable) && C103 > 3000
    (configurable))
             ++d21
        else
             ++d22
      update state to current state
```

At every sampling instance (e.g., 10 seconds) from the above counters, transition probabilities are computed to get the transition matrix 100 above $$p11=d11/(d11+d12)$$

$$p12=d12/(d11+d12)$$

$$p21=d21/(d21+d22)$$

$$p22=d22/(d21+d22)$$

From the transition probabilities, the probability of quantization high occurrence (P1) and quantization low occurrence (P2) can be computed. The probability of quantization high occurrence will be used in curve-fit function 70 to get the final image complexity value 72.

Since the limiting state probabilities are independent of initial conditions, the simultaneous equations for the limiting-state probabilities can be solved, as follows:

$$0 = \sum_i P_i p_{ij} - P_j \qquad \text{Equation (6)}$$
$$j = 1, 2$$

$$1 = \sum_j P_j \qquad \text{Equation (7)}$$
$$j = 1, 2$$

Substituting and expanding the transition probabilities in equations (6) and (7) above, $$0 = P1*(p11-1) + P2*p21 \qquad \text{Equation (8)}$$

$$1 = P1 + P2 \qquad \text{Equation (9)}$$

The above two equations are solved to get P1 and P2. Assign, IP100 = P1 (probability of VCL layer complexity high occurrence in the macroblocks) to be used in image complexity equation.

BP101, BP103 and IP100 are used in the curve fit equation 70 (FIG. 10) to get an image complexity 72 that falls in the range of between 2 and 3.

Image Complexity ($\lceil$)

$$\lceil = 2 + \ln(1 + IP100) + \ln(2 + B103 - B101) \qquad \text{Equation (10)}$$

for ($\lceil > 3$) $\lceil = 3$

Although several embodiments have been described in detail for purposes of illustration, various modifications may be made to each without departing from the scope and spirit of the invention.

What is claimed is:

1. A process for broadcasting multiple video streams on a single channel, comprising the steps of:
   analyzing complexity indication changes and bit rate changes in a video coding layer of each of said multiple video streams;
   creating a statistical model to dynamically compute image complexity of each of said multiple video streams;
   determining the effect of the image complexity of said multiple video streams on said broadcast; and
   distributing available channel bandwidth among said multiple video streams based upon the determined effect of the image complexity of each of said multiple video streams;
   wherein the creating step includes the steps of:
   creating a first statistical model of video coding layer complexity indication changes for discrete sections of each video stream;
   creating a second statistical model of video coding layer bit rate changes or bandwidth variation for the same discrete sections of each video stream;
   combining the first and second statistical models from the discrete sections of each video stream; and
   calculating the image complexity for the discrete sections of each video stream based upon the combined first and second statistical models; and
   the process further comprises the steps of:
   counting high quantization transitions, slice/macroblocks and inter/intra prediction types for picture/slice/macroblock types by determining quantization changes in the discrete sections of each video stream; and
   counting bandwidth variation by determining bandwidth of video coding layer data in the discrete sections of each video stream;
   wherein the counting steps comprise incrementing a first counter for each quantization change, incrementing a second counter for each macroblock, incrementing a third counter for each slice, and incrementing a fourth counter for each low, average and high bandwidth state transition.

2. The process of claim 1, wherein the analyzing step includes the step of analyzing video coding layer complexity indication changes in parameters of discrete sections of the video streams.

3. The process of claim 2, wherein the discrete sections of the video streams include slice, macroblocks, quantization, inter-coded reference blocks, intra-coded reference blocks, and non-reference macroblock/slice/picture types.

4. The process of claim 1, further comprising the step of estimating video quality in loss states.

5. The process of claim 1, further comprising the steps of:
   computing a probability for video coding layer complexity for the discrete sections of each video stream using the first, second, third and fourth counters; and computing a probability for low, average and high bandwidth states for the discrete sections of each video stream using the first, second, third and fourth counters.

6. The process of claim 5, further comprising the steps of:
constructing a first transition probability matrix for video coding layer complexity transition of the discrete sections of each video stream; and
constructing a second transition probability matrix for bandwidth state transition of the discrete sections of each video stream.

7. The process of claim 6, further comprising the step of computing image complexity of the discrete sections of each video stream using limiting state probabilities obtained from each transition probability matrix.

8. A process for broadcasting multiple video streams on a single channel, comprising the steps of:
analyzing complexity indication changes and bit rate changes in a video coding layer in parameters of discrete sections of each of said multiple video streams;
creating a statistical model to dynamically compute image complexity of each of said multiple video streams;
determining the effect of the image complexity of said multiple video streams on said broadcast;
distributing available channel bandwidth among said multiple video streams based upon the determined effect of the image complexity of each of said multiple video streams; and
estimating video quality in loss states;
wherein the creating step includes the steps of:
creating a first statistical model of video coding layer complexity indication changes for the discrete sections of each video stream;
creating a second statistical model of video coding layer bit rate changes or bandwidth variation for the same discrete sections of each video stream;
combining the first and second statistical models from the discrete sections of each video stream; and
calculating the image complexity for the discrete sections of each video stream based upon the combined first and second statistical models; and
the process further comprises the steps of:
counting high quantization transitions, slice/macroblocks and inter/intra prediction types for picture/slice/macroblock types by determining quantization changes in the discrete sections of each video stream; and
counting bandwidth variation by determining bandwidth of video coding layer data in the discrete sections of each video stream;
wherein the counting steps comprise incrementing a first counter for each quantization change, incrementing a second counter for each macroblock, incrementing a third counter for each slice, and incrementing a fourth counter for each low, average and high bandwidth state transition.

9. The process of claim 8, wherein the discrete sections of the video streams include slice, macroblocks, quantization, inter-coded reference blocks, intra-coded reference blocks, and non-reference macroblock/slice/picture types.

10. The process of claim 8, further comprising the steps of:
computing a probability for video coding layer complexity for the discrete sections of each video stream using the first, second, third and fourth counters; and
computing a probability for low, average and high bandwidth states for the discrete sections of each video stream using the first, second, third and fourth counters.

11. The process of claim 10, further comprising the steps of:
constructing a first transition probability matrix for video coding layer complexity transition of the discrete sections of each video stream; and
constructing a second transition probability matrix for bandwidth state transition of the discrete sections of each video stream.

12. The process of claim 11, further comprising the step of computing image complexity of the discrete sections of each video stream using limiting state probabilities obtained from each transition probability matrix.

13. A process for broadcasting multiple video streams on a single channel, comprising the steps of:
analyzing complexity indication changes and bit rate changes in a video coding layer of each of said multiple video streams;
creating a first statistical model of video coding layer complexity indication changes for discrete sections of each video stream;
creating a second statistical model of video coding layer bit rate changes or bandwidth variation for the same discrete sections of each video stream;
combining the first and second statistical models from the discrete sections of each video stream to dynamically compute image complexity of each of said multiple video streams;
determining the effect of the image complexity of said multiple video streams on said broadcast;
distributing available channel bandwidth among said multiple video streams based upon the determined effect of the image complexity of each of said multiple video streams;
calculating the image complexity for the discrete sections of each video stream based upon the combined first and second statistical models;
estimating video quality in loss states;
counting high quantization transitions, slice/macroblocks and inter/intra prediction types for picture/slice/macroblock types by determining quantization changes in each video stream; and
counting bandwidth variation by determining bandwidth of video coding layer data in each video stream;
wherein the counting steps comprise incrementing a first counter for each quantization change, incrementing a second counter for each macroblock, incrementing a third counter for each slice, and incrementing a fourth counter for each low, average and high bandwidth state transition.

14. The process of claim 13, further comprising the steps of:
computing a probability for video coding layer complexity for the discrete sections of each video stream using the first, second, third and fourth counters; and
computing a probability for low, average and high bandwidth states for the discrete sections of each video stream using the first, second, third and fourth counters.

15. The process of claim 14, further comprising the steps of:
constructing a first transition probability matrix for video coding layer complexity transition of the discrete sections of each video stream; and
constructing a second transition probability matrix for bandwidth state transition of the discrete sections of each video stream.

16. The process of claim 15, further comprising the step of computing image complexity of the discrete sections of each video stream using limiting state probabilities obtained from each transition probability matrix.

17. The process of claim 13, wherein the analyzing step includes the step of analyzing video coding layer complexity indication changes in parameters of the discrete sections of the video streams, and wherein the discrete sections of the video streams include slice, macroblocks, quantization, inter-coded reference blocks, intra-coded reference blocks, and non-reference macroblock/slice/picture types.

18. A process for broadcasting multiple video streams on a single channel, comprising the steps of:
　analyzing complexity indication changes and bit rate changes in a video coding layer of each of said multiple video streams;
　creating a statistical model to dynamically compute image complexity of each of said multiple video streams by creating a first statistical model of video coding layer complexity indication changes for discrete sections of each video stream, creating a second statistical model of video coding layer bit rate changes or bandwidth variation for the same discrete sections of each video stream, combining the first and second statistical models from the discrete sections of each video stream, and calculating the image complexity for the discrete sections of each video stream based upon the combined first and second statistical models;
　counting high quantization transitions, slice/macroblocks and inter/intra prediction types for picture/slice/macroblock types by determining quantization changes in the discrete sections of each video stream and counting bandwidth variation by determining bandwidth of video coding layer data in the discrete sections of each video stream, wherein the counting steps comprise incrementing a first counter for each quantization change, incrementing a second counter for each macroblock, incrementing a third counter for each slice, and incrementing a fourth counter for each low, average and high bandwidth state transition;
　determining the effect of the image complexity of said multiple video streams on said broadcast; and
　distributing available channel bandwidth among said multiple video streams based upon the determined effect of the image complexity of each of said multiple video streams.

19. The process of claim 18, further comprising the steps of:
　computing a probability for video coding layer complexity for the discrete sections of each video stream using the first, second, third and fourth counters; and
　computing a probability for low, average and high bandwidth states for the discrete sections of each video stream using the first, second, third and fourth counters.

20. The process of claim 19, further comprising the steps of:
　constructing a first transition probability matrix for video coding layer complexity transition of the discrete sections of each video stream; and
　constructing a second transition probability matrix for bandwidth state transition of the discrete sections of each video stream.

21. The process of claim 20, further comprising the step of computing image complexity of the discrete sections of each video stream using limiting state probabilities obtained from each transition probability matrix.

* * * * *